June 29, 1965  R. J. COLVERT  3,191,997
MEANS AND METHODS FOR BALANCING WHEELS
Filed March 23, 1964  2 Sheets-Sheet 1

INVENTOR.
RANDAL J. COLVERT
BY
Joseph A. Fenlon, Jr.
ATTORNEY

June 29, 1965 R. J. COLVERT 3,191,997
MEANS AND METHODS FOR BALANCING WHEELS
Filed March 23, 1964 2 Sheets-Sheet 2

INVENTOR.
RANDAL J. COLVERT
BY
Joseph A. Fenlon, Jr.
ATTORNEY

United States Patent Office 3,191,997
Patented June 29, 1965

3,191,997
MEANS AND METHODS FOR BALANCING WHEELS
Randal J. Colvert, 5545 Sandpiper Drive, St. Louis County, Mo.
Filed Mar. 23, 1964, Ser. No. 353,687
8 Claims. (Cl. 301—5)

This invention relates to wheel balancing in general and to thermo-electric wheel balancing in particular.

It is the object of the present invention to provide a scientifically accurate means and method for wheel balancing which is completely independent of the skill and knowledge of the operator.

It is another object of this invention to provide a means and method for balancing wheels which accomplishes wheel balancing while the wheel is attached to the vehicle.

It is a further object of the present invention to provide a means and method of the type described which is re-usable during the life of the wheel.

With the above and other objects in view, which will become immediately apparent upon reading the specification, my invention resides in the unique and novel form, construction, arrangement and combinations of parts and steps described in the annexed specification and drawings.

Figure 3:
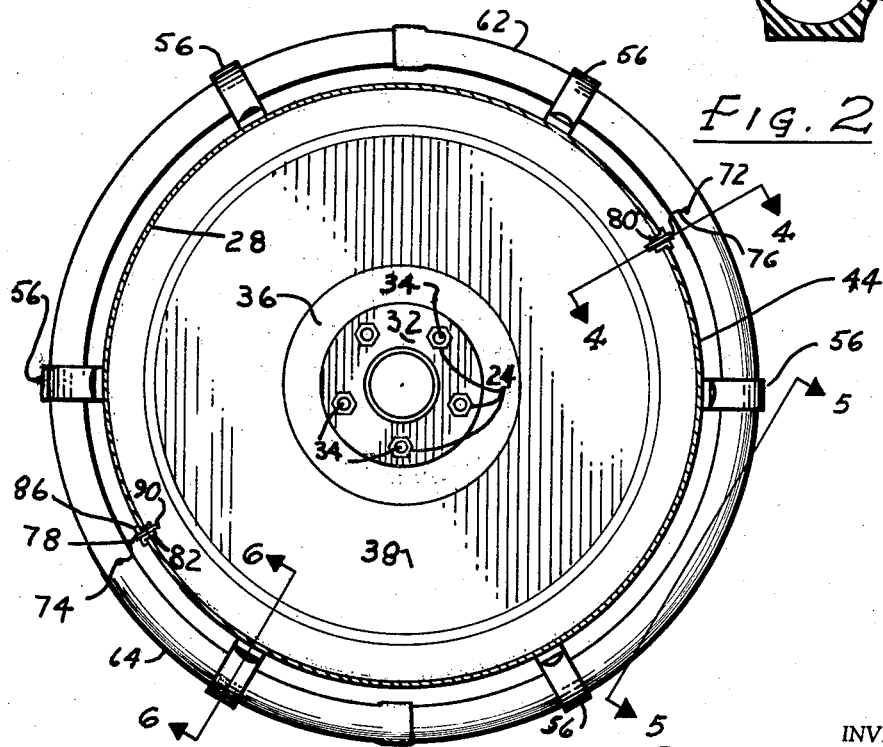
FIGURE 3 is a fragmentary sectional view taken along lines 3—3 of FIGURE 2.
Figure 4:
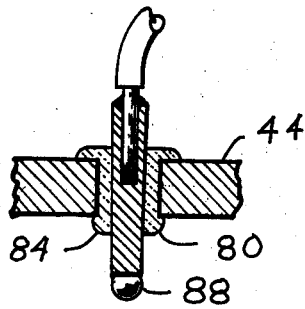
Figure 5:
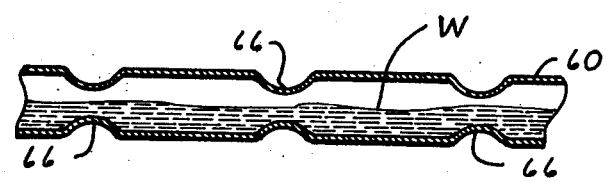
Figure 9:
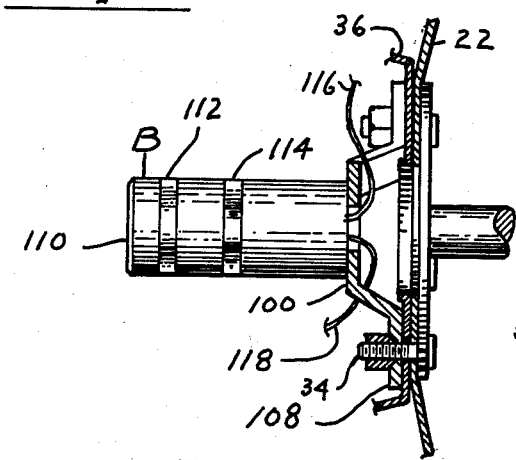
Figure 8:
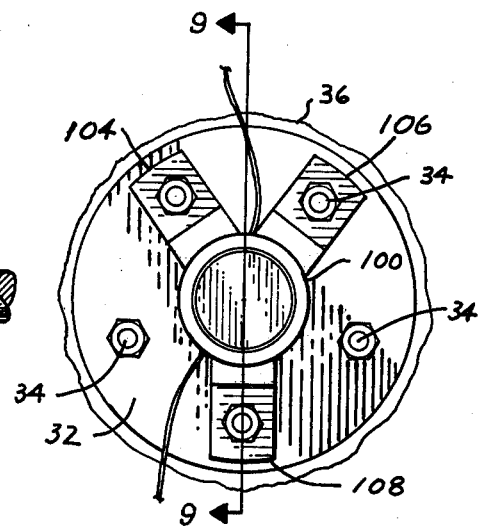
Figure 7:
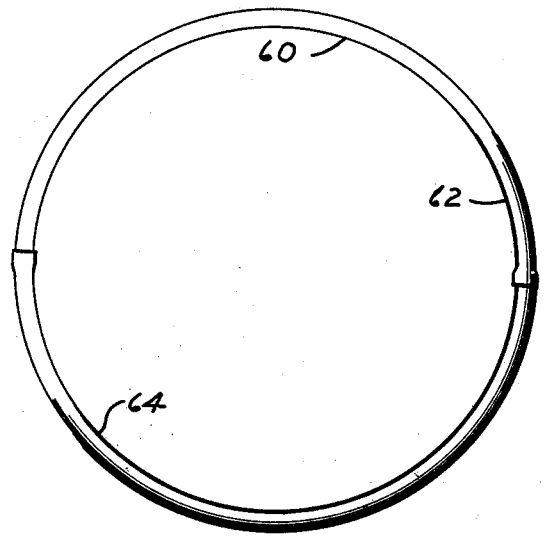
Figure 6:
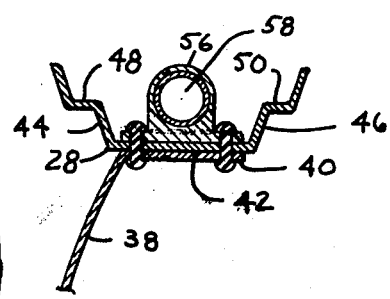

FIGURES 4, 5 and 6 are enlarged fragmentary sectional views taken along lines 4—4, 5—5, and 6—6, respectively, of FIGURE 3;

FIGURE 7 is a front elevational view of the two rings swedged together to form the loop;

FIGURE 8 is an enlarged fragmentary elevational view of the wheel with the slip ring attachment affixed thereto;

FIGURE 9 is a fragmentary sectional view taken along lines 9—9 of FIGURE 8.

Referring now in more detail and by reference character to the drawings, which illustrate a preferred embodiment of my invention, A designates an automobile wheel 20 mounted and secured to a conventional drum 22 by means of conventional lug nuts 24.

The wheel 20 comprises a tire 26, a rim 28 and a hub 30. In the conventional manner, the hub 30 includes a flat annular disc 32 adapted for receiving the lugs 34 from the drum 22, an annular wall 36 integrally connected to the disc 32 and extending laterally and radially outwardly therefrom, an annular outer face 38 integrally connected to the wall 36, and a cylindrical ring 40 which is integrally connected to the face 38 and projects inwardly toward the drum 22.

Figure 1:
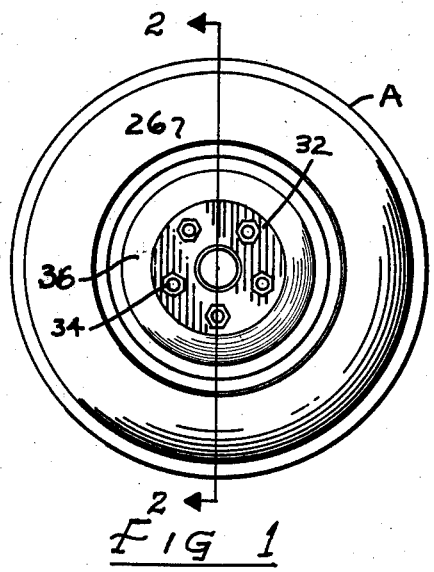
FIGURE 1 is a front elevational view of a wheel embodying the present invention.
Figure 2:
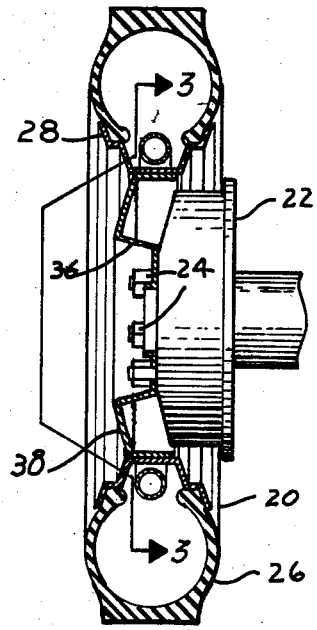
FIGURE 2 is an enlarged sectional view taken along lines 2—2 of FIGURE 1.

Welded or otherwise rigidly secured to the ring 40 along its bight 42 and extending radially outwardly therefrom is the rim 28 comprising a bight 42; a pair of outwardly diverging rings 44, 46; a pair of spaced aligned annular shoulders 48, 50; and a pair of outer tire retaining walls 52, 54. In the conventional manner, the tire 26 is held to the rim 28 by pressurized air from within forcibly urging the inner portions of the tire 26 against the shoulders 48, 50, and the walls 52, 54 as best seen in FIGURE 2.

Riveted or otherwise rigidly secured to the outer surface of the bight 42 is a plurality of spaced insulators 56, each provided with a tube receiving aperture 58 (as best seen in FIGURE 6). The insulators 56 are conventionally mounted in a manner which will retain air pressure within the tire 26. Extending through the apertures 58 and held therein in spaced and electrical separation from the rim 28 is a tube 60 formed of two swedged together semi-circular sections 62, 64, each identical to the other and each provided on its sides with a plurality of spaced dimples 66 as best seen in FIGURE 5 for purposes presently more fully to appear. At the junctures 68, 70, of the sections 62, 64, the individual sections are electrically secured to one another by brazing, silver soldering, or some other acceptable means according to the metal used to construct the sections 62, 64. Contained within the tube 60 is approximately eleven ounces of a weighting material W (preferably though not necessarily solder) which is temperature sensitive to the extent that it will remain solid at all temperatures normally to be encountered during the operation of an automobile but will become fluid at elevated temperatures.

Electrically connected to the sections 62, 64, at diametrally opposing points thereof 72, 74, respectively, are wires 76, 78. It should be here noted that the points 72, 74 are to be located so that the electrical paths between the points in either available direction are paths of substantially equal resistance. At their respective opposing ends, the wires 76, 78, are respectively connected to electrical feed-through connectors 80, 82, which are identical in construction, one to the other, and which are mounted in the outer ring 44 in diametrally opposing relation as best seen in FIGURE 3.

The feed-through connectors 80, 82, respectively comprise grommets 84, 86, and metallic inserts 88, 90. FIGURE 4 best shows the construction of the connector 80 and the manner in which the wire 76 is soldered to the insert 88. When the inserts 88, 90 are urged through the grommets 84, 86, respectively, an airtight seal is formed for purposes of retaining air pressure within the tire 26.

In the drawings, B designates a slip-ring attachment comprising a base 100 including a centrally located aperture 102 and three legs 104, 106, 108, each sized and adapted for attachment to the wheel A as best seen in FIGURES 8 and 9. Bonded to the base 100 and extending laterally outwardly therefrom is a lightweight cylindrical insulator 110 provided with conventional slip rings 112, 114, to each of which is respectively attached connecting wires 116, 118, all for purposes presently more fully to be seen. It should be noted that all components of the slip ring attachment B are of lightweight material.

In the operation of my wheel balancing invention, the slip ring attachment B is mounted on the wheel A as shown in FIGURES 8 and 9. For purposes of illustration only, I shall explain the method of balancing the rear wheels. In the balancing of one rear wheel, the rear end of the automobile (not shown) is raised from the floor and the automobile is placed into driving gear. The ends of the wires 116, 118 are connected removably to the inserts 88, 90, respectively, of the feed-through connectors 80, 82, according to conventional electric technique using alligator clips (not shown) or some other equivalent device.

Thereafter, a source of electrical energy is connected to the slip rings 112, 114, and electrical current is urged from the slip ring 114 through the wire 118, the feed-through connector insert 90, the wire 78, the parallel electrical paths of the tube 60, the wire 76, the insert 88, the wire 116, and back to the slip ring 112. Electrical energy is applied to the above described circuit as the rear wheel is rotated at high velocity by the automobile engine (not shown). As the energy is applied the tube 60 heats to a temperature which causes the weighting material W to assume a fluid nature. As the material W becomes fluid, the centrifugal force of the rotating wheel 20 will disperse the material W throughout the tube 60 in such manner that the wheel will become balanced. Thereafter, the source of electrical energy is cutoff and the wheel A is continued to be rotated at high velocity while the tube 60 cools, which in turn causes the weighing material W to re-solidify. The spaced dimples 66 hold the material W in place after solidification and the wheel retains its balance. Thereafter, the slip ring attachment B is removed from the wheel A and the lug nuts 24 are replaced on the lugs 34 to secure the wheel 20 rigidly to the drum 22. Because the attachment B was selected of lightweight material, its effect on wheel balance is negligible.

The front wheels of the automobile may be balanced in similar manner, the only difference being the need for a conventional machine to rotate the front wheels at high velocity while the automobile's front end is raised from the floor. These machines are available in most garages.

It has been found by experiment the above invention performs satisfactorily using a stainless steel tube of ⅜ inch inside diameter and having a wall thickness of 0.035 inch for the tube 60 and a weighting material of lead of eleven (11) ounces. Using the above material, three volts applied across the slip rings 112, 114, will cause the lead to melt in about 60 seconds. Solder may be used instead of lead, but lead is preferable as it will adhere to the inside of the stainless steel tube 60 as it cools.

It should also be noted that by the location of the tube 60 in a plane which cuts through the center of gravity of the wheel 20, the wheel 20 is more accurately balanced and bearing wear is reduced.

It should be understood that changes, alterations and modifications in the form, construction, arrangement and combination of the various parts and steps of my invention may be made and substituted for those herein shown without departing from the nature and principle of my invention.

Having thus described my invention, what I claim and desire to secure by Letters Patent is set forth in the following claims.

1. The method of balancing wheels which comprises forming a tubular ring, depositing a preselected amount of normally solid, temperature sensitive weighting material within the ring, closing the ring, securing the ring to a hub in a radial plane which passes through the center of gravity of the hub, placing a tubeless tire on the hub and about the ring whereby to form a wheel in which the tire and the hub define an air chamber and the ring lies within said air chamber, rotating the wheel to an operational angular velocity, heating the ring to a temperature sufficient to cause the weighting material to become liquid while the wheel is being rotated, retaining the application of the heating to the ring for a period of time sufficient to permit the liquidized weighting material to be positioned within the ring by the centrifugal forces developed by the rotating wheel, and thereafter cooling the ring and weighting material while continuing the rotation of the wheel.

2. For use with a wheel including a hub and an annular rim secured to the hub and adapted for receiving a tubeless tire, wheel balancing means comprising a tubular ring mounted on said rim and defining a circular path within the ring about the axis of the wheel, a mass of lead containing material mounted within the tubular path and being normally solid and adapted for turning to liquid when substantial quantities of heat are applied thereto, said ring being mounted in the air chamber between the rim and the tire and being thermally insulated from said rim and said tire, means for selectively heating the material and the ring while the wheel is being rotated at operational angular velocities, and means for selectively removing the heat from the ring and material and cooling the ring and the material without stopping the rotation of the wheel.

3. For use with a wheel including a hub and an annular rim secured to the hub and adapted for receiving a tubeless tire, wheel balancing means comprising a tubular ring mounted on said rim and defining a circular path within the tube about the axis of the wheel, a mass of lead containing material mounted within the tubular path and being normally solid and adapted for turning to liquid when substantial quantities of heat are applied thereto, said ring being mounted in the air chamber between the rim and the tire and being thermally electrically insulated from said rim and said tire, and electrical means for selectively heating the material and the ring while the wheel is being rotated at operational angular velocities, and for selectively removing the heat from the ring and material and cooling the ring and the material without stopping the rotation of the wheel.

4. For use with a wheel including a hub mounted on a rotating drum, a rim secured to the periphery of the hub, and a tubeless tire mounted on the rim; wheel balancing means comprising a tubular ring mounted on the rim in the air chamber between the rim and the tire in electrical and thermal isolation from the rim and the tire, said ring being of electrically conductive material, a mass of lead containing material enclosed within the tubular portion of the ring and being normally solid and adapted for turning to liquid upon heating, and control means for selectively causing electrical current to flow along parallel electrical paths in the ring while the ring is mounted as aforesaid and the wheel is being rotated at operational velocities, whereby to heat the material into liquid form while the wheel and the drum are being rotated, said control means also including first means for retaining the flow of electrical current through the ring during the rotation of the wheel and second means for selectively stopping the flow of electrical current through the ring without breaking the rotation of the wheel and drum.

5. For use with a wheel including a hub mounted on a rotating drum, a rim secured to the periphery of the hub, and a tubeless tire mounted on the rim; wheel balancing means comprising a tubular ring mounted on the rim in the air chamber between the rim and the tire in electrical and thermal isolation from the rim and the tire, said ring being of electrically conductive material, said ring being located in a radial plane which passes through the center of gravity of the wheel, a mass of lead containing material enclosed within the tubular portion of the ring and being normally solid and adapted for turning to liquid upon heating, and control means for selectively causing electrical current to flow along parallel electrical paths in the ring while the ring is mounted as aforesaid and the wheel is being rotated at operational velocities, whreby to heat the material into liquid form while the wheel and the drum are being rotated, said control means also including first means for retaining the flow of electrical current through the ring during the rotation of the wheel and second means for selectively stopping the flow of electrical current through the ring without breaking the rotation of the wheel and drum.

6. For use with a wheel including a hub mounted on a rotating drum, a rim secured to the periphery of the hub, and a tubeless tire mounted on the rim; wheel balancing means comprising a tubular ring mounted on the rim between the rim and the tire in electrical and thermal isolation therefrom, said ring being of electrically conductive material, said ring being located in a radial plane which passes through the center of gravity of the wheel, a mass of lead containing material enclosed within the tubular portion of the ring and being normally solid and adapted for turning to liquid upon heating, a first electrical conductor connected at one end to first point on the ring and at the other end to a first feed through connector mounted on the rim, a second electrical conductor connected at one end to a second point on the ring and at the other end to a second feed through connector also mounted on the rim, said first and second points being located on the ring to define two parallel electrical paths of substantially equal resistance, said first and second feed through connectors each including conductive means externally of the wheel which are respectively connected to the first and second points, and control means for selectively directing electrical current through the first and second feed through connectors, the first and second conductors and the parallel paths of the ring while the wheel is being rotated at substantial velocity.

7. The device of claim 6 wherein the control means includes a slip ring attachment removably mounted on the wheel and drum and rotatable therewith, a first slip ring electrically connected to the conductive means of the first feed through connector, and a second slip ring electrically connected to the conductive means of the second feed through connector.

8. The device of claim 6 wherein the ring is provided with a plurality of spaced indentations adapted for holding the material in place within the tube after re-solidification.

References Cited by the Examiner

UNITED STATES PATENTS

| | | | |
|---|---|---|---|
| 1,209,730 | 12/16 | Leblanc. | |
| 2,494,244 | 1/50 | Jonard et al. | 73—458 X |
| 2,687,918 | 8/54 | Bell et al. | 301—5 |
| 2,853,344 | 9/58 | Stout | 301—5 |
| 2,981,818 | 4/61 | Trabilcy | 137—341 X |

FOREIGN PATENTS

| | | |
|---|---|---|
| 679,522 | 9/52 | Great Britain. |
| 1,048,393 | 8/53 | France. |

ARTHUR L. LA POINT, *Primary Examiner.*